United States Patent [11] 3,623,995

[72] Inventor Kenneth W. French
 Mineola, N.Y.
[21] Appl. No. 758,225
[22] Filed Sept. 9, 1968
[45] Patented Nov. 30, 1971
[73] Assignee GTE Laboratories Incorporated

[54] ACTIVE MEDIUM FOR A LIQUID LASER AND METHOD OF PREPARATION THEREOF
 9 Claims, 3 Drawing Figs.
[52] U.S. Cl. ..................................... 252/301.4,
 331/94.5, 330/4.3
[51] Int. Cl. ..................................... C09k 1/08,
 C09k 1/16, H01s 3/00
[50] Field of Search .......................... 252/301.4;
 331/94.5

[56] References Cited
 UNITED STATES PATENTS
 3,404,351  10/1968  Heller ........................ 252/301.4
 OTHER REFERENCES
 Heller, A High Gain Room-Temperature Liquid Laser: Trivalent Neodymium in Selenium Oxychloride– Applied Physics Letters, Vol. 9, No. 3, 1st Aug. 1966, pp. 106– 108 Copy in Patent Office Search Center
 Lempicki et al., Characteristics of $ND^{+3}$: $SeOCl_2$ Liquid Laser– Applied Physics Letters, Vol. 9, No. 3; 1st Aug. 1966, pp. 108– 110 Copy in Patent Office Search Center
 Blumenthal et al., New Room Temperature Liquid Laser; Nd(III) in $POCL_3$ – $SnCL_4$ – Journal of Chemical Physics, Vol. 48, No. 12, 15 June 1968, pg. 5726

*Primary Examiner* — Tobias E. Levow
*Assistant Examiner* — R. D. Edmonds
*Attorney* — Irving Kriegsman

ABSTRACT: An active medium for a liquid laser containing selenium oxychloride solvated neodymium ions in a solution of phosphorous oxychloride and a Lewis acid. The liquid active medium is prepared by first dissolving a neodymium compound in a mixture of selenium oxychloride and a Lewis acid and then evaporating the solution to form a solid. The resulting solid material is then added to a mixture of phosphorous oxychloride and a Lewis acid.

ACTIVE MEDIUM FOR A LIQUID LASER AND METHOD OF PREPARATION THEREOF

BACKGROUND OF THE INVENTION

This invention relates to an active medium for a liquid laser and to a method of preparation thereof.

The recent development of a high-gain room temperature liquid laser utilizing an active medium containing neodymium in a solution of selenium oxychloride and a Lewis acid has demonstrated that inorganic liquid lasers compare favorably in threshold and output with the best known solid-state laser materials, such as neodymium-doped crystals or ruby. The characteristics of this type of liquid laser are described in detail in two articles appearing in Applied Physics Letters Vol. 9 No. 3 pp 106–110, Aug. 1, 1966.

Generally, the inorganic liquid laser exhibits a high quantum yield of fluorescence and a low power threshold due to the reduction of radiationless relaxations of the active agent in solution. The radiationless relaxations result in part from the high-energy vibrations of bonds involving light atoms, particularly hydrogen. Consequently, the achieving of low threshold and high output in a liquid active medium requires that the solvent employed contain only heavy atoms. This requirement has limited the number of solvents heretofore suitable for use in liquid laser.

In addition, the selection of the solvent used is determined by the solubility of the compound containing the active agent, typically neodymium ions, in the solvent. This is due primarily to the fact the power threshold i.e., the power density necessary to produce stimulated emission of radiation, is a function of the concentration of active ions. In order to obtain the concentrations needed for moderate threshold levels, the solvent employed is characterized by a relatively high dielectric constant so that the forces between the cation and anion of the compound are reduced thereby lessening the tendency of the compound to precipitate. The dielectric constant of the solvent selenium oxychloride is approximately 46. However, it has been necessary to add an acidifying agent to the selenium oxychloride solution in order to provide low threshold operation. The agent added is a Lewis acid defined as a substance which can accept an electron pair from a base. A more detailed description of a low threshold liquid active medium utilizing a Lewis acid to increase the active ion concentration is contained in the copending U.S. Pat. application, Ser. No. 604,362, filed Dec. 23, 1966 and assigned to the same assignee.

The selenium oxychloride based liquid medium has been found to combine high output and low threshold and demonstrates that liquid media compare favorably with solid media. However, laser solutions prepared with this solvent are highly corrosive and toxic. Consequently, these solutions are difficult to handle and contain. Since one of the important features of a liquid medium is its ability to be circulated, the combination of toxicity and corrosiveness has increased the complexity of the system. As a result, the development of low toxicity and substantially noncorrosive liquid media having performance characteristics which are comparable to those of the selenium oxychloride medium is desirable.

SUMMARY OF THE INVENTION

This invention relates to an active medium for a liquid laser and a method of preparation thereof. In particular, the active medium provided by the present invention exhibits a low toxicity and the low corrosiveness desired in circulating liquid laser systems.

The active medium utilizes selenium oxychloride solvated active ions which are added to a mixture of phosphorous oxychloride and a Lewis acid. The solvated active ions, typically neodymium, are prepared from a first solution containing acidified selenium oxychloride as the solvent. The selenium oxychloride solvent is acidified by the addition of a Lewis acid to promote the solubility of the active ions therein.

When the first solution containing the active ions in the mixture of selenium oxychloride and a Lewis acid is prepared, the solution is heated to provide evaporation drying and thereby form a residual solid. The solid contains selenium oxychloride solvated active ions. These solvated ions are found to dissolve in a mixture of phosphorous oxychloride and a Lewis acid and provide a laser medium which exhibits a low threshold and high output. Since the dielectric constant of phosphorous oxychloride is relatively low, about 14, the addition of substantial amounts of active agents to the solution has been heretofore characterized by the formation of a precipitate containing the active ion. However, the present method of preparing a phosphorous oxychloride based active medium provides a low toxicity, essentially noncorrosive medium having operating characteristics which compare favorably with those of presently available liquid active media.

Further features and advantages of the present invention will become more readily apparent from the following detailed description of specific embodiments thereof.

DESCRIPTION OF THE PREFERRED EMBODIMENTS

Figure 1:
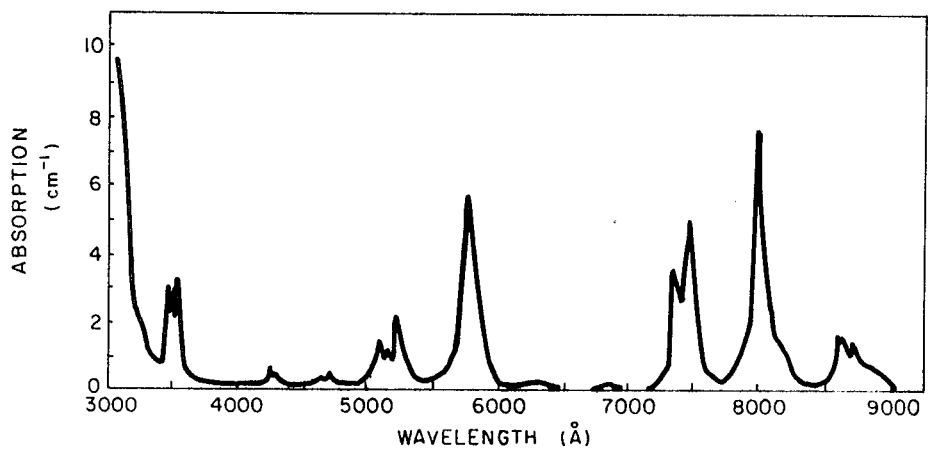
FIG. 1 shows the absorption spectrum of the present active medium.

The present active medium for a liquid laser contains selenium oxychloride solvated active ions in a mixture of phosphorous oxychloride and a Lewis acid.

The selenium oxychloride solvated active ions are prepared by dissolving a compound containing the active ion in a mixture of selenium oxychloride and a Lewis acid. In solution, the compound dissociates into cations and anions with the active ion, typically a rare earth ion, constituting the cation. The cation forms a complex with the solvent so that the cation is solvated by a surrounding zone of oriented solvent ions. The complex formed by the solvated cation is determined by the number of immediate neighbors the cation favors. In the case of the neodymium cation, the complex contains 8, 9, or 10 immediate neighbors. The immediate neighbor atom, in this case oxygen, forms a coordinate bond with the cation. The immediate neighbor shares a pair of electrons with the cation.

The selenium oxychloride is characterized by a relatively high dielectric constant. However, a Lewis acid is required to be added to the selenium oxychloride in order to increase the concentration of the active agent in the solvent. A Lewis acid is defined as a substance which can accept an electron pair from a base. When added to the selenium oxychloride, the Lewis acid combines with the anion of the solvent, typically a chloride ion. The acid enhances the solubility of the compound in the solvent by combining with and, in effect, removing chloride anions from the solution. This provides additional solvent cations in accordance with the solubility product of the solvent and, therefore, increases the number of active ions in the solution.

The compound containing the active ion is typically a chloride or oxide. In addition, the active ion is normally a rare earth ion and preferably neodymium since it has an absorbance characteristic which enables it to be readily pumped by commercially available flashlamps. The amount of the Lewis acid utilized in the preparation of the solution containing the selenium oxychloride solvent is, in practice, determined primarily by the amount of the compound added to the solution. The following examples show the preparation of the selenium oxychloride solution for different compounds and Lewis acids.

EXAMPLE I

One hundred grams of the anhydrous Lewis acid $SnCl_4$ was diluted to 0.2 liter by the gradual addition of vacuum distilled $SeOCl_2$. Then 17 grams of neodymium oxide, $Nd_2O_3$ was added to the mixture and the solution was slowly brought to a boil at a temperature of about 120° C. and a pressure of about 40 mm. of Hg.

EXAMPLE II

Seventy-five grams of anhydrous Lewis acid $SbCl_5$ were diluted to 0.1 liter by the gradual addition of vacuum distilled $SeOCl_2$. Then 75 grams of anhydrous neodymium trichloride, $NdCl_3$, was added to the mixture. The solution was then slowly brought to a boil at about 120° C. at a pressure of 40 mm. of Hg.

While the above examples recite $SnCl_4$ and $SbCl_5$ as the Lewis acids, other Lewis acids such as $SnBr_4$, $GeCl_4$, $TiCl_4$, and $SO_3$ may be employed. The concentration of the active ions in the solution is not critical since the prepared selenium oxychloride solution is evaporation dried by the boiling.

The boiling of the solution results in the formation of a wet solid which begins to appear in substantial quantities when approximately 60 percent of the liquid has been removed. The actual period of boiling depends upon the initial viscosity of the selenium oxychloride solution and the degree of dryness desired in the resulting solid. After boiling for a period of about 30 minutes, approximately 60 to 70 percent of the liquid is removed and solid matter is observed. The remaining solution was then cooled to room temperature in a period of about 15 minutes whereupon the remainder of the liquid entered a solid phase. The result is a wet solid containing selenium oxychloride solvated ions. While the above-described relatively short boiling period provides a wet solid, the period may be extended to produce a dry solid without affecting the operating characteristics of the active medium provided by this method.

As mentioned, the solid contains solvated active ions. This solid is found to be readily dissolved in a mixture of phosphorous oxychloride and a Lewis acid. The low dielectric constant of phosphorous oxychloride has heretofore limited the concentration of active ions that can be dissolved in the solution even with the addition of the Lewis acid acidifying agent. However, the concentrations, typically 0.3M, obtained by the addition of selenium oxychloride solvated ions provide a liquid active medium having a low threshold and a high output. In addition, the present medium is characterized by a low toxicity and a noncorrosiveness unlike media utilizing selenium oxychloride as the solvent.

The solid, which in the case of neodymium is a blue-purple color, is added to a mixture of phosphorous oxychloride and a Lewis acid. The mixture is typically a 5 to 1 volume mixture of phosphorous oxychloride and the Lewis acid. The same Lewis acid can be used as in the preparation of the first solution. However, different Lewis acids may be employed if desired.

The amount of Lewis acid is determined primarily by the amount of solvated ion added to the mixture. In practice, the amount of solvated ion added to the mixture of phosphorous oxychloride and Lewis acid is that required to obtain an active ion concentration within the range of 0.1M to 1.0M. The corresponding amounts of Lewis acid ranged from 0.1M to 2.0M.

Figure 2:
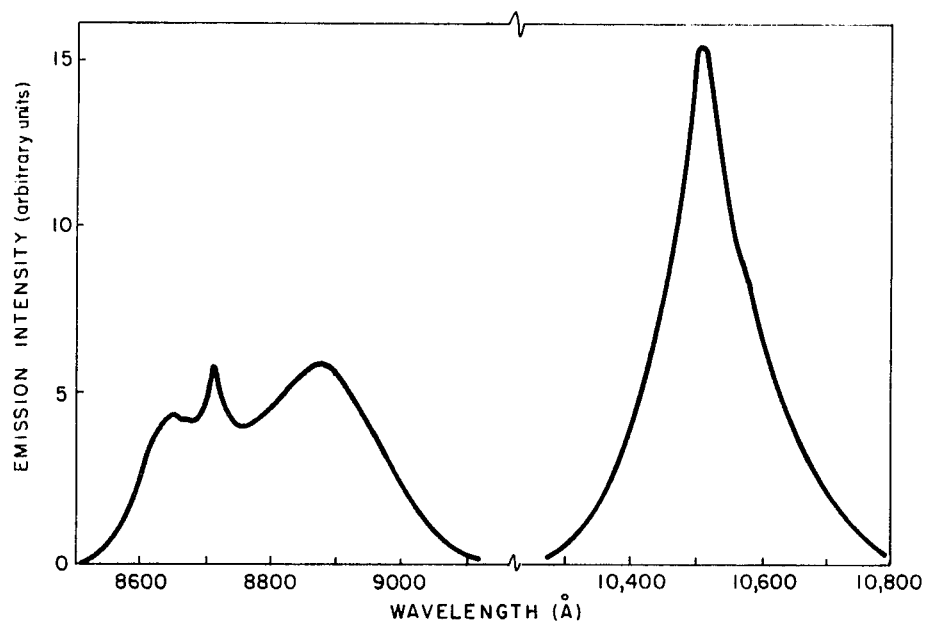
FIG. 2 shows the emission spectrum of the present active medium.
Figure 3:
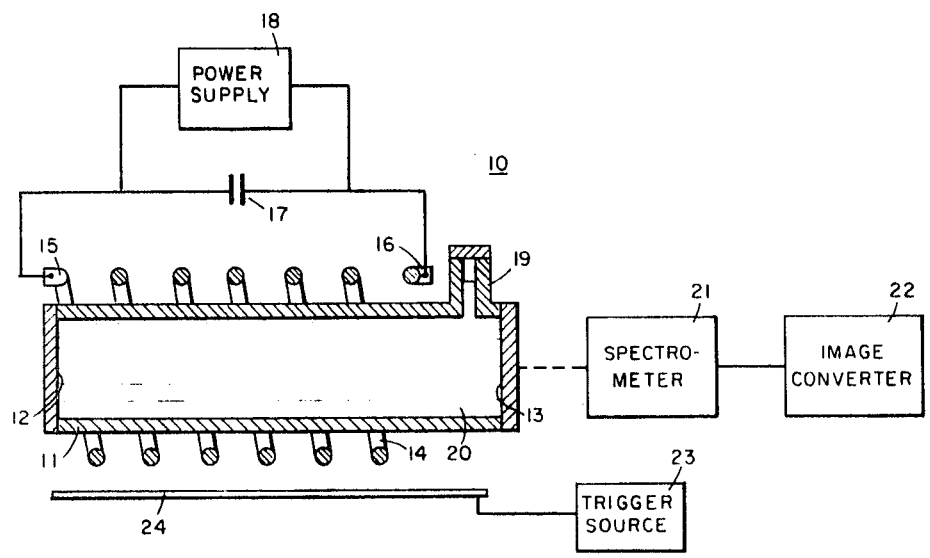
FIG. 3 is a schematic representation of a liquid laser.

The spectral distribution of absorbance and emission for the selenium oxychloride solvated neodymium ions in a mixture of phosphorous oxychloride and Lewis acid are shown in FIGS. 1 and 2. These spectral distributions are found to be essentially independent of the particular compound and Lewis acid employed. The present medium was tested and operated in the laser structure shown in FIG. 3. The laser structure 10 is shown comprising a hollow transparent cylinder 11 which may be made of any material which transmits light in the pumping region, such as quartz, pyrex, and the like. In practice, the cylinder 11 may be formed of commercial glass tubing. First and second optically flat end seals 12 and 13 are fused to the ends of the cylinder. These end-seals may be either transparent to the radiation emitted by the laser or provided with reflecting coatings depending on the desired application. Typical cylinders have bore diameters of 2 to 10 mm. and lengths ranging between 2 and 12 inches.

The end-sealed cylinder is filled with the active liquid medium through side-arm 19 which is then sealed. If the medium is to be circulated a second side-arm may be provided and the side-arms used as input and output ports. A flashlamp 14 is placed around the cylinder. Electrodes 15 and 16 are connected to the ends of the helical flashtube. A capacitor 17 is coupled between the electrodes. Power supply 18 maintains a constant voltage of about 10 kilovolts across capacitor 17. The structure is maintained at room temperature.

When the lamp is flashed by applying a 20 kilovolt trigger pulse to wire 24 from trigger source 23, energy is absorbed by the active medium 20 and the stimulated emission is obtained through the end-seals 12 and 13. The wavelength of the stimulated emission is primarily determined by the active ion in the liquid medium.

The low threshold high energy output and sharpness of the emission line obtained with a laser utilizing the present medium compares favorably with the known selenium oxychloride media. The peak fluorescent emittance from the present liquid medium is a measure of the gain of the laser and is essentially equal to the emittance of a neodymium ion in selenium oxychloride medium under identical excitation.

While many modifications and variations may be made in the aforedescribed invention, it will be recognized that many modifications and variations may be made therein without departing from the spirit and scope of the invention.

What is claimed is:

1. A method of making a liquid active medium for a laser which comprises the steps of
   a. heating a first solution containing selenium oxychloride, a Lewis acid and a compound containing an active ion to evaporate a portion of said solution and form a solid, said solid containing selenium oxychloride solvated active ions, and
   b. adding the solid to a mixture of phosphorous oxychloride and a Lewis acid to form a second solution, said second solution constituting an active medium for a liquid laser.

2. The method of claim 1 wherein said first solution is heated to evaporate approximately 60 percent of the liquid.

3. The method of claim 2 further comprising the step of cooling said first solution to solidify the remaining liquid.

4. The method of claim 1 wherein said first solution contains a rare earth compound.

5. The method of claim 4 wherein said rare compound is selected from the group consisting of chlorides and oxides.

6. The method of claim 4 wherein said rare earth compound is a compound containing neodymium.

7. The method of claim 6 wherein said first and second solutions contain a Lewis acid selected from the group consisting of $SnCl_4$, $SbCl_5$, $SnBr_4$, $GeCl_4$, $TiCl_4$ and $SO_3$.

8. An active medium for a liquid laser which consists essentially of a solution containing
   a. selenium oxychloride solvated active neodymium ions;
   b. phosphorous oxychloride, and
   c. a Lewis acid, said acid enhancing the solubility of said solvated ions in phosphorous oxychloride.

9. The medium of claim 8 wherein said Lewis acid is selected from the group consisting of $SnCl_4$, $SbCl_5$, $SnBr_4$, $GeCl_4$, $TiCl_4$, and $SO_3$.

* * * * *